United States Patent Office 3,725,119
Patented Apr. 3, 1973

3,725,119
METHOD FOR DECORATING SURFACES
Charles A. Coffey and Michael J. Catena, Tampa, Fla., assignors to Harris Paint Company, Tampa, Fla.
No Drawing. Continuation-in-part of application Ser. No. 44,590, June 8, 1970. This application Feb. 8, 1971, Ser. No. 113,729
Int. Cl. B44d 1/08
U.S. Cl. 117—104 R                    10 Claims

ABSTRACT OF THE DISCLOSURE

A method for giving solid and porous surfaces sparkling brilliance by the application thereto of a vehicle to which solid, highly reflectant, colored or uncolored particles have been added, which comprises: applying to the surface to be coated a spray of a composition comprising solid particles which may be solely solid polyester resin or polyester resin blended with other particles capable of effecting brilliance such as metallic or glass particles, a vehicle for said particles which may contain colorants such as opaque or transparent pigments or dyes, and a means of propelling the composition such as an aerosol propellant or other pressure systems to spray aforementioned composition, thereby providing various mono or multi-colored reflective effects. Silk screening as well as conventional spray is included.

---

This application is a continuation-in-part application of Ser. No. 44,590, filed June 8, 1970, entitled "Method for Decorating Surfaces", now abandoned.

The invention relates to a method for depositing solid, highly reflective, sparkling colored particles on all types of substrata including metal, wood, plastic, styrofoam, and any other surface that will support a film.

Colored metallized flakes or solid particles or a plastic material have heretofore been limited to application from conventional, large type spray equipment as compared with an aerosol or have had to be roller coated, screen printed, cast, flocked, or extruded.

The primary object of this invention is to apply solid, highly reflectant, colored or uncolored particles of a plastic organic material, metallic or glass, to solid or porous surfaces by spraying such particles dispersed in a vehicle, utilizing the ease of application characteristic of aerosol use or silk screening.

Various solid polyester resin particles, coated or uncoated, can be used in accordance with this invention. They must be capable of brilliance. Polyethylene terephthalate particles have excellent brilliance properties and are relatively inert. The size of the particles can be from the smallest practical size to say .008 x .008 x .001 inch. A suitable amount of polyester resin particles is in the range of from 0.5 to 10% of a total aerosol spraying composition, or from 0.5 to 31.0% of a silk screening composition.

In case no aerosol propellant is used in a spraying composition, a suitable amount of polyester resin particles is in the range of from 0.5 to 35.0%, preferably 31.0% by weight of the total spraying composition.

Metallic particles can be used together with the polyester particles, e.g. minute, coated or uncoated, aluminum flakes up to a size of say .008 x .008 x .00045 inch. The total amount of metallic particles and polyester resin particles preferably should not be higher than 10% by weight of a total aerosol spraying composition.

Inorganic, non-metallic, coated or uncoated, particles can also be used together with the polyester particles and the metallic particles, e.g. minute glass particles. The total amount of inorganic, non-metallic particles and polyester resin particles preferably should not be higher than 10% by weight of a total aerosol spraying composition.

The second object of this invention is to provide the novelty of applying polyester resin particles, solely or admixed with other reflectant particles by means other than aerosol. This would permit substantially higher percentages of reflectant particles in the spraying composition as compared with a total aerosol formulation. Examples of this are included but are not intended to limit the range of percentages which could be operable. Rather it is the novelty of combining reflectant particles, polyester resin solely or admixed to produce reflective effects; to this end, the percentage of reflectant particles in a spraying composition has been successfully applied at 35.0% total reflectant particles in a spraying composition.

The above principle when extended to silk screening, the total reflectant particle percentage has been successfully applied at 31.0% total reflectant particles.

Suitable vehicle compounds of this invention are polymeric compounds capable of solution or dispersion in solvents or diluents:

(1) Alkyds such as dibasic acids fatty acids and other linear carbon chain acids reacted with polyols of mono, di, tri, or higher hydroxy functionality. The dibasic acids include phthalic anhydride, isophthalic acid, maleic anhydride, fumaric acid, and other dibasic acids capable of alkyd formation. All alkyds, which belong to any of the groups called modified drying oil, modified non-drying oil, nonphthalic, modified resin, modified styrene, modified vinyltoluene, and alkyds modified or admixed with urea or melamine resins, are contemplated.

(2) Oleoresinous compounds, such as epoxy compounds, phenolics, maleic adducts, petroleum resins. These compounds can be "cooked" or dispersed in vegetable type oils capable of thermal polymerization or dissolved in suitable solvents.

(3) Cellulose polymers and derivatives, "lacquer" type systems, in which polymers such as nitrocellulose, cellulose acetate butyrate, cellulose acetate and ethyl cellulose are suitably blended with alkyds, plasticizers, resins, and solvents. Dibutyl phthalate is one suitable plasticizer. The choice of plasticizer is not particularly important to the success of the invention. The cellulose polymer or derivative and the plasticizer are dissolved in a solvent to produce a system which is sprayable.

Suitable solvents for the above-mentioned vehicle systems are aliphatic, aromatic, halogenated or oxygenated solvents, alcohols and water. Sprayable solutions, as well as sprayable dispersions or emulsions of said vehicle systems, can be produced.

Summing up, suitable vehicle systems of the present invention are various solvent or water soluble acrylic polymers, vinyl acetate polymers, co-polymers of vinyl resins, coumarone-indene resins, petroleum resins, silicone, amine, phenolic rosin derived, polyester, terpene, natural, urethane, and chlorinated resins.

However, the vehicle system is limited by the strength of the solvents used. Solvents used in aerosol formulations should be of low solvent strength. However, this deos not preclude the use of minor percentages of strong solvents. Very strong solvents are to be avoided, as they could possibly solubilize the polyester resin and extract colorants from the polyester resin particles or other aforementioned types of reflectant particles.

A suitable amount of vehicle and solvent is from 30 to 89.5% by weight of an aerosol spraying composition, or from 69 to 99.5% of a silk screening composition.

In case no aerosol propellant is used in a spraying composition, a suitable amount of vehicle and solvent is from 69 to 99.5% by weight of the total spraying composition.

Aerosol propellants used include both halogenated types and hydrocarbon types of conventional aerosol propellants.

A suitable amount of aerosol propellant is from 10 to 60.0% by weight of an aerosol spraying composition.

The size of the polyester resin particles used will vary with the effect desired. Use of large size particles gives a more dramatic appearance to the substrata so sprayed.

Pigments can also be added to the spray composition of this invention and include the usual opaque or transparent types, with or without inclusion of dyes.

Colors of the polyester resin particles include the following, or mixtures thereof:

| | |
|---|---|
| Silver | Blue |
| Light Green | Marigold |
| Dark Green | Gold |

Obviously, as color tastes vary, the range of colors is expandable and the invention is not confined to the above colored polyester resin particles.

Colors of the metallic include, but do not limit other possible colors, the following or mixtures thereof:

| | |
|---|---|
| Bright Silver | Purple |
| Sand | Prussian Blue |
| Pale Gold | Medium Blue |
| Dark Gold | Royal Blue |
| Golden Fiesta | Aqua |
| Chartreuse | Emerald |
| Golden Orange | Lavender |
| Bright Orange | Brilliant Copper |
| Apricot | Antique Brown |
| Brilliant Red | Black |
| Fuschia | |

In the examples infra there will be shown a "base" consisting of the polyester resin particles solely or blended with other reflectant particles and the vehicle therefor. This "base" is delivered to an open aerosol can, suitable agitators are added (spherical marbles or rivets are adequate); the spray valve is crimped onto the aerosol can, and the propellant is injected into the can. While low temperature filling is possible, the injection method is more suited to the practice of this invention.

Conventional cylindrical aerosol cans of any size can be used for the practice of this invention; four ounce to 16 ounce cans are preferred.

The assembled can, ready for use, should contain one or more objects in the can which, upon shaking of the can, will effect agitation of its contents. This can easily be accomplished by, before closing the can, dropping one or more spherical marbles or rivets into the can. Label directions on the can will indicate the need for frequent shaking of the can.

Illustrative of the valve type which can be used are the B type as well as the R type valves of Newman-Green, Inc., specifically R-10-128 and B-14-10-128. However, when larger sized polyester resin particles are used, the use of a vapor tap valve assembly is preferred, as this assembly essentially eliminates the possibility of the valve dip tube becoming clogged with polyester resin particles. The vapor tap feature is available in both B and R type valves.

The velocity of the exhausting formulation is important and can be regulated in some degree and otherwise controlled by choice of spray head used to actuate the valve assembly. While the invention is not limited to specific spray head slots and orifices, the following spray heads, manufactured by Newman-Green, Inc., have been found to be suitable 103/55/60; 103/27/40; 110/55/32; 160/27/71; 160/27/73; 160/55/73; 182/152/32.

In the practice of the invention, aerosol formulations are charged into the aerosol can, the spray head is affixed, the aerosol can is shaken to insure distribution of the contents, the spray head is pressed, and the valve assembly is actuated to deliver the product onto the desired substrata.

In Devilbliss equipment (Chicago, Ill.), or other similar conventional spray equipment, it is not necessary to limit particle size to the above-mentioned dimensions.

The following are illustrative examples of formulations that may be used and serve to further clarify the method of the present invention.

EXAMPLE 1

2 pounds polyester resin particles (.008 x .008 x .001 inch) (Meadowbrook) and 4 pounds coated aluminum flakes (.008 x .008 x .00045 inch) (Meadowbrook) are added to 30 pounds of an acrylic resin solvent solution (Rohm & Haas). If colorant is added, 1 pound polyester resin particles and 2 pounds coated aluminum flakes will give approximately the same result, when the composition is suitably solvated and sprayed with an aerosol propellant onto the substrate to be coated and made brilliant.

EXAMPLE 2

2 pounds polyester resin particles and 4 pounds coated glass flakes (F 19245, Potters Bros., Carlstadt, N.Y.) are added to 30 pounds of an acrylic resin solution. Additional amounts solvent can be added to overcome possible spray problems with conventional equipment.

EXAMPLE 3

2 pounds polyester resin particles are added to 30 pounds of an acrylic resin solution. Additional amounts of solvent can be added to overcome possible spray problems with conventional equipment.

Propellants, such as the conventional halogenated propellants, single and blended, and hydrocarbon propellants, and all blends of these propellants, can be successfully used for spraying the above-mentioned systems of vehicle solvents and particles in conventional spray aerosol equipment.

EXAMPLE 4

2 pounds polyester resin particles, 4 pounds aluminum flakes, 20 pounds Soya Alkyd, 4 pounds Melmac 243-3 (American Cyanamide), 0.4 pound zirconium octoate (ZR-6%, Nuodex Products), and 0.9 pound Oil Red (American Cyanamide) are added to a solvent, suitable for spraying, to produce a product which is capable of being cured by heat, i.e. at a conventional baking temperature of 300° F. for 10 minutes, so an outstanding finish is obtained.

EXAMPLE 5

2 pounds polyester resin particles, 1.8 pounds coated metal flakes, 6.45 pounds of an acrylic resin solution (45% NVM, Rohm & Haas), and 0.15 pound Oil Red (American Cyanamide) are admixed with a "bodying" additive, such as 20% Zinc Stearate Gel. The composition will silk screen to produce a brilliant finish. Additional amounts of said additive can be used to overcome penetration problems.

That which is claimed is:

1. A method for applying a composition imparting sparkling brilliance to solid and porous surfaces from a manually-operated aerosol can fitted with a vapor-tap valve assembly, wherein the composition comprises between about 0.5 to about 10.0% by weight of a total charge to the can of polyester resin particles up to the order of about 0.008 x 0.008 x 0.001 inch and between about 30 and about 89.5% by weight of a total charge to said can of a vehicle system, hardenable or curable on solid and porous surfaces, for the polyester resin particles, comprising a solvent and a polymeric compound capable of solution or dispersion in the solvent, which comprises propelling said composition from the can by an aerosol propellant, which propellant comprises from about 10% to about 60% by weight of said total charge to said can.

2. The method of claim 1, wherein said composition comprises between about 0.5 and about 10.0% by weight of a mixture of polyester resin particles up to the order of about 0.008 x 0.008 x 0.001 inch and other reflectant particles up to the order of about 0.008 x 0.008 x 0.00045 inch and between about 30 and about 89.5% by weight of the vehicle system, hardenable or curable on solid and porous surfaces, for the mixture.

3. The method of claim 2, wherein the vehicle system contains a dye or transparent pigment.

4. The method of claim 1, wherein the vehicle system contains a dye or transparent pigment.

5. The method of claim 1, wherein the surface to be coated is selected from the group consisting of metal, wood, plastic, and rigid foamed products.

6. A method for applying a composition imparting sparkling brilliance to solid and porous surfaces from a manually-operated aerosol can fitted wtih a vapor-tap valve assembly and a sprayhead in which an elongated expansion chamber is incorporated upstream of a nozzle orifice of the sprayhead, wherein the composition comprises between about 0.5 and about 10.0% by weight of a total charge to the can of polyester resin particles up to the order of about 0.008 x 0.008 x 0.001 inch and between about 30 and about 89.5% by weight of the total charge to said can of a vehicle system, curable or hardenable on solid and porous surfaces, for the polyester resin particles, comprising a solvent and a polymeric compound capable of solution or dispersion in the solvent, which comprises propelling said composition from the can by an aerosol propellant, which propellant comprises from about 10% to about 60% by weight of said total charge to said can.

7. The method of claim 6, wherein said composition comprises between about 0.5 and about 10.0% by weight of a mixture of polyester resin particles up to the order of about 0.008 x 0.008 x 0.001 inch and other reflectant particles up to the order of about 0.008 x 0.008 x 0.00045 inch and between about 30 and about 89.5% by weight of the vehicle system, curable or hardenable on solid and porous surfaces, for the mixture.

8. The method of claim 7, wherein the vehicle system contains a dye or transparent pigment.

9. The method of claim 6, wherein the vehicle system contains a dye or transparent pigment.

10. The method of claim 6, wherein the surface to be coated is selected from the group consisting of metal, wood, plastic, and rigid foamed products.

References Cited
UNITED STATES PATENTS

| | | | |
|---|---|---|---|
| 3,251,704 | 5/1966 | Nellessen | 106—193 P |
| 3,536,509 | 10/1970 | Tay | 106—193 M |
| 3,194,675 | 7/1965 | Carter et al. | 117—33 X |
| 3,519,577 | 7/1970 | Olson | 260—75 T X |
| 2,934,512 | 4/1960 | Godshalk | 117—160 R X |
| 2,287,053 | 6/1942 | Murphy | 117—160 R X |

RALPH S. KENDALL, Primary Examiner

U.S. Cl. X.R.

206—41 C; 106—193 P; 117—161 VB, 161 ZB, 161 K